United States Patent
Wu

(10) Patent No.: US 9,677,651 B2
(45) Date of Patent: Jun. 13, 2017

(54) LINEAR ACTUATOR

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 297 days.

(21) Appl. No.: 14/271,416

(22) Filed: May 6, 2014

(65) Prior Publication Data

US 2015/0204426 A1  Jul. 23, 2015

(30) Foreign Application Priority Data

Jan. 22, 2014 (TW) .............................. 103201356 U

(51) Int. Cl.
F16H 3/06 (2006.01)
F16H 27/02 (2006.01)
(Continued)

(52) U.S. Cl.
CPC ....... *F16H 25/20* (2013.01); *F16H 2025/209* (2013.01); *F16H 2025/2046* (2013.01);
(Continued)

(58) Field of Classification Search
CPC ....... F16H 2025/2046; F16H 2025/209; F16H 25/2056; F16H 2025/2053;
(Continued)

(56) References Cited

U.S. PATENT DOCUMENTS 2,918,786 A * 12/1959 Geyer ..................... F15B 13/10
60/718
7,458,562 B1 * 12/2008 Chen ........................ B66F 3/10
254/103
(Continued)

FOREIGN PATENT DOCUMENTS

CN 102057183 A 5/2011
CN 102562992 A 7/2012
(Continued)

OTHER PUBLICATIONS

Office Action dated Nov. 30, 2016 of the corresponding German patent application.
(Continued)

*Primary Examiner* — William Kelleher
*Assistant Examiner* — Jake Cook
(74) *Attorney, Agent, or Firm* — Chun-Ming Shih; HDLS IPR Services

(57) ABSTRACT

A linear actuator includes a telescoping sleeve (100). The telescoping sleeve (100) includes an inner sleeve (110), an intermediate sleeve (120) sheathing the inner sleeve (110) and an outer sleeve (130) sheathing the intermediate sleeve (120). A base (200) connected to the intermediate sleeve (120); a motor (300) arranged on the base (200); a reduction worm gear (400) pivoted on the base (200) and driven by the motor; a rotor worm (500) pivoted on the base (200) and engaged with the reduction worm gear (400); a rotor worm gear (800) pivoted on the base (200); a stator worm (700) inserted in the rotor worm gear (800) and connected to the outer sleeve (130); and a stator nut (900) connected to the inner sleeve (110) and engaged with the rotor worm (500) are arranged in the telescoping sleeve (100).

11 Claims, 11 Drawing Sheets

(51) Int. Cl.
    *F16H 29/02*      (2006.01)
    *F16H 29/20*      (2006.01)
    *F16H 25/20*      (2006.01)

(52) U.S. Cl.
    CPC ........... *F16H 2025/2053* (2013.01); *F16H 2025/2059* (2013.01); *F16H 2025/2081* (2013.01); *Y10T 74/18616* (2015.01)

(58) Field of Classification Search
    CPC ..... F16H 2025/2059; F16H 2025/2081; F16H 2025/2093; A47B 2009/046; A47B 9/04
    See application file for complete search history.

(56) References Cited

U.S. PATENT DOCUMENTS

| | | | | |
|---|---|---|---|---|
| 2002/0104395 | A1* | 8/2002 | Zimmerman | A47B 9/04 74/89.35 |
| 2002/0162410 | A1* | 11/2002 | Zimmerman | A47B 9/04 74/89.35 |
| 2005/0236534 | A1* | 10/2005 | Bondesen | A47B 9/04 248/161 |
| 2008/0028878 | A1* | 2/2008 | Wang | F16H 25/20 74/89.35 |
| 2012/0227522 | A1 | 9/2012 | Wu | |
| 2013/0319148 | A1* | 12/2013 | Alfano | F16H 25/20 74/89.32 |

FOREIGN PATENT DOCUMENTS

| | | |
|---|---|---|
| CN | 102647048 A | 8/2012 |
| CN | 203285907 U | 11/2013 |
| DE | 102007053044 B3 | 6/2009 |
| DE | 102011018718 A | 10/2012 |
| DE | 202013102455 U1 | 6/2013 |
| DE | 102012022788 B3 | 12/2013 |
| JP | 2012192787 A | 10/2012 |
| TW | I223035 B | 11/2004 |
| TW | M306065 | 2/2007 |

OTHER PUBLICATIONS

Dthce Action date Nov. 22, 2016 of the corresponding China patent application.

* cited by examiner

LINEAR ACTUATOR

BACKGROUND

Field of the Invention

A linear actuator is provided in the present disclosure, particularly a linear actuator having dual worms.

Description of Prior Art

Linear actuator is a mechanism having a worm and a worm gear engaged with each other, the worm and the worm gear are rotated relative to each other, and therefore let both move with respect to each other along an axial direction thereof. The Linear actuator could thereby move a heavy object. A conventional linear actuator having dual worms is applied for a long stroke motion. A conventional linear actuator having dual worms includes a telescoping sleeve with three segments and two assemblies having a worm and a worm gear. The worms and the worm gears are driven by a motor, and the telescoping sleeve is thereby moved.

Since two worms are arranged in the telescoping sleeve, the motor should be attached at a bottom or a lateral surface of the conventional linear actuator. Therefore, the conventional linear actuator is generally huge, and is not suitable for a narrow space.

A conventional linear actuator is disclosed in a prior patent TWM306065. The conventional linear actuator includes a telescoping sleeve and a motor arranged in the telescoping sleeve, and the conventional linear actuator is thereby downsized. The conventional linear actuator is driven by the motor via reduction gears, and motions of the conventional linear actuator are therefore unstable.

In views of this, in order to solve the above disadvantage, the present inventor studied related technology and provided a reasonable and effective solution in the present disclosure.

SUMMARY

A main purpose of the present disclosure is providing a linear actuator having dual worms.

A linear actuator including a telescoping sleeve is provided in the present disclosure. The telescoping sleeve is included of an inner sleeve, an intermediate sleeve sheathing the inner sleeve and an outer sleeve sheathing the intermediate sleeve. A base connected to the intermediate sleeve; a motor arranged on the base; a reduction worm gear pivoted on the base and driven by the motor; a rotor worm pivoted on the base and engaged with the reduction worm gear; a rotor worm gear pivoted on the base; a stator worm inserted in the rotor worm gear and connected to the outer sleeve; and a stator nut connected to the inner sleeve and engaged with the rotor worm are arranged in the telescoping sleeve.

The linear actuator is further included of a passive worm gear pivoted on the base along an axial direction thereof and engaged with the rotor worm, and the rotor worm gear is engaged with the passive worm gear.

A bearing is preferably arranged between the reduction worm gear and the base.

An end of the outer sleeve is preferably covered and closed by a bottom plate, and the other end thereof is open and sheathing the intermediate sleeve.

An end of the stator worm is preferably fixed on the bottom plate.

An end of the intermediate sleeve is preferably covered and closed by the base, and the other end thereof is open and sheathing the inner sleeve.

An end of the inner sleeve is preferably covered and closed by a top plate, and the other end thereof is open and inserted in the intermediate sleeve.

The linear actuator is further included of a casing tube inserted in the telescoping sleeve, an end of the casing tube is connected on the top plate, the stator nut is connected on the other end of the casing tube, and the rotor worm is inserted in the casing tube.

The rotor worm gear is preferably of a hollow cylindrical shape, outer worm teeth are provided on an external surface of the rotor worm gear, inner worm teeth are provided on an internal surface of the rotor worm gear, the outer worm teeth are engaged with the passive worm gear, and the inner worm teeth are engaged with the stator worm.

The motor, the rotor worm, the passive worm gear, the rotor worm gear, the stator worm, and the stator nut are preferably axially parallel with the telescoping sleeve.

An axial direction the passive worm gear is preferably perpendicular with another axial direction of the telescoping sleeve.

The stator worm is preferably off-axis corresponding to the telescoping sleeve.

The stator nut is preferably off-axis corresponding to the telescoping sleeve.

The linear actuator of the present disclosure is included of dual worm, and therefore able to extend bi-direction to rapidly move an object. The motor of the linear actuator is arranged in the telescoping sleeve, and the linear actuator is therefore downsized. The motor drives other elements via the reduction worm gear, and the linear actuator is much stable than a conventional one.

DETAILED DESCRIPTION OF EMBODIMENT

Figure 1:
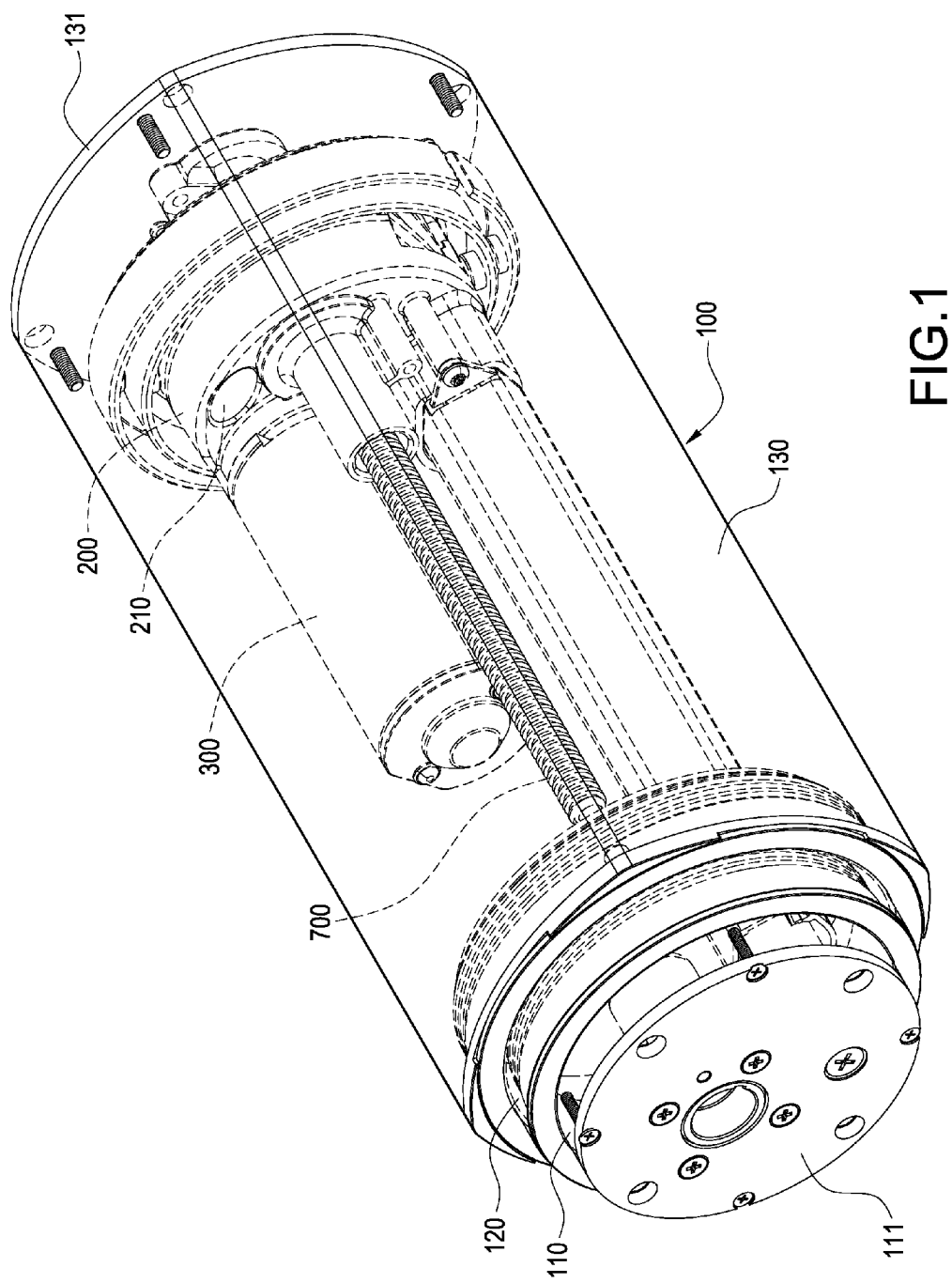
FIG. 1 is the first schematic view showing the first embodiment of the present disclosure.
Figure 2:
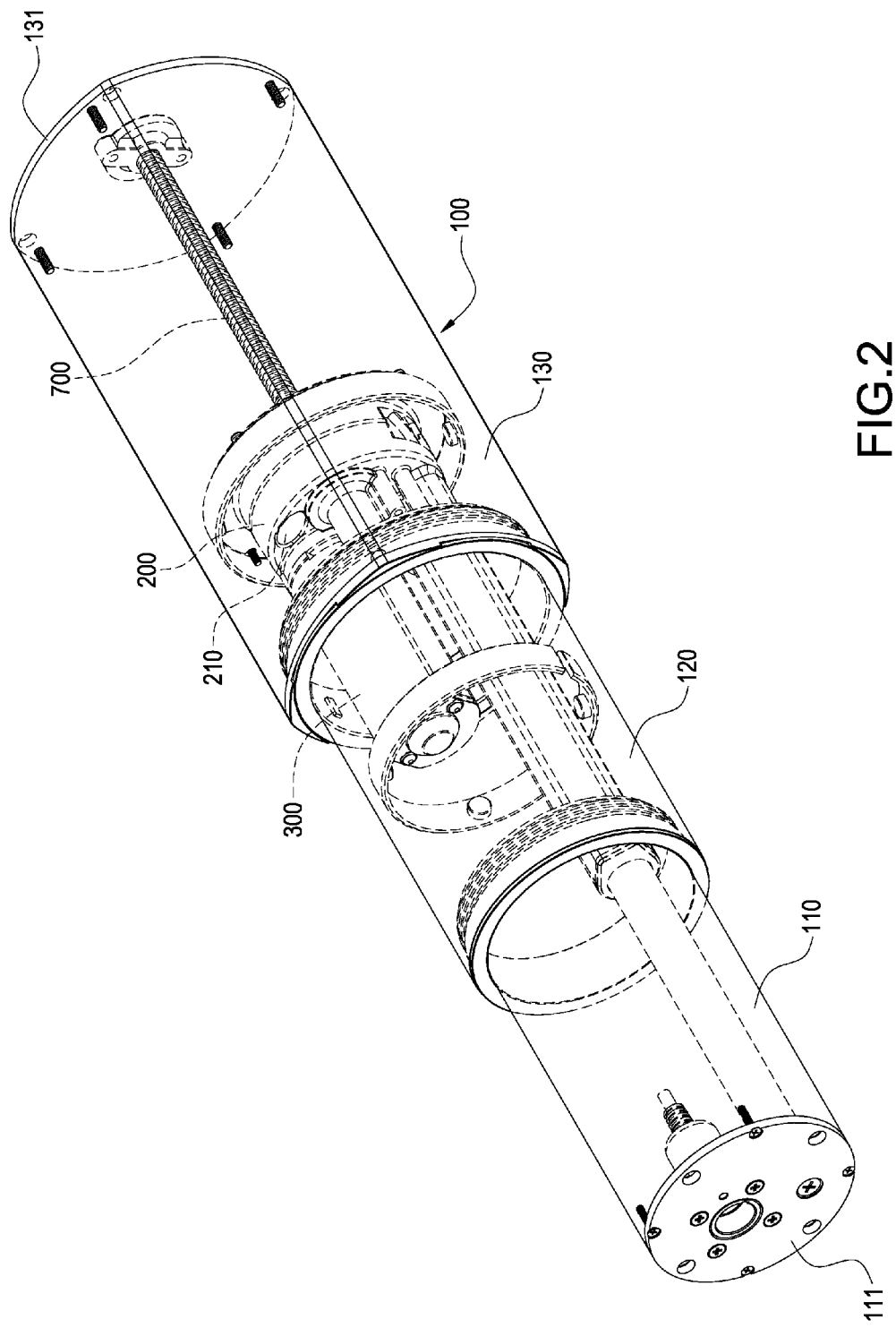
FIG. 2 is a schematic view showing the extended linear actuator in the first embodiment of the present disclosure.
Figure 3:
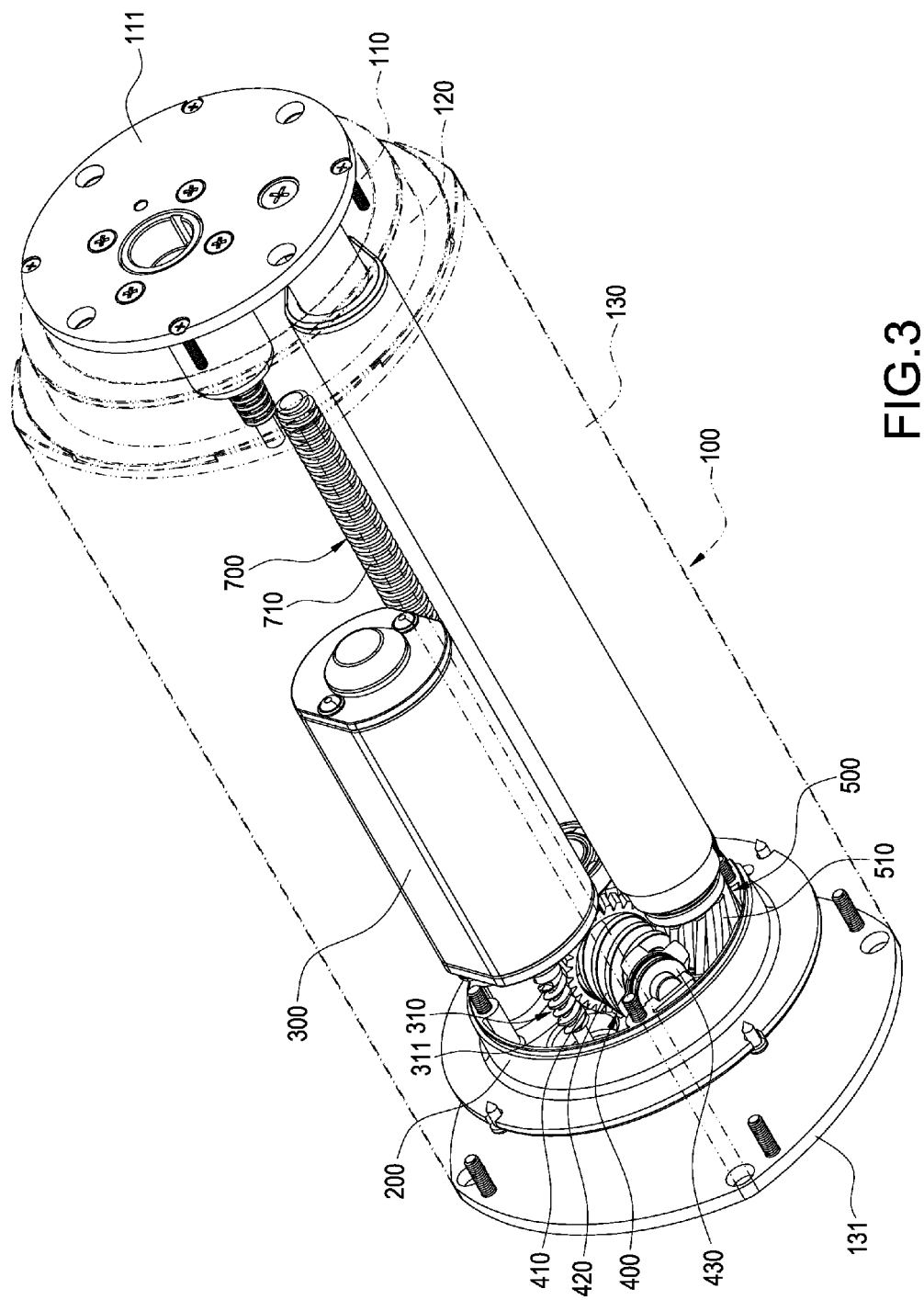
FIG. 3 is the second schematic view showing the extended linear actuator in the first embodiment of the present disclosure.
Figure 4:
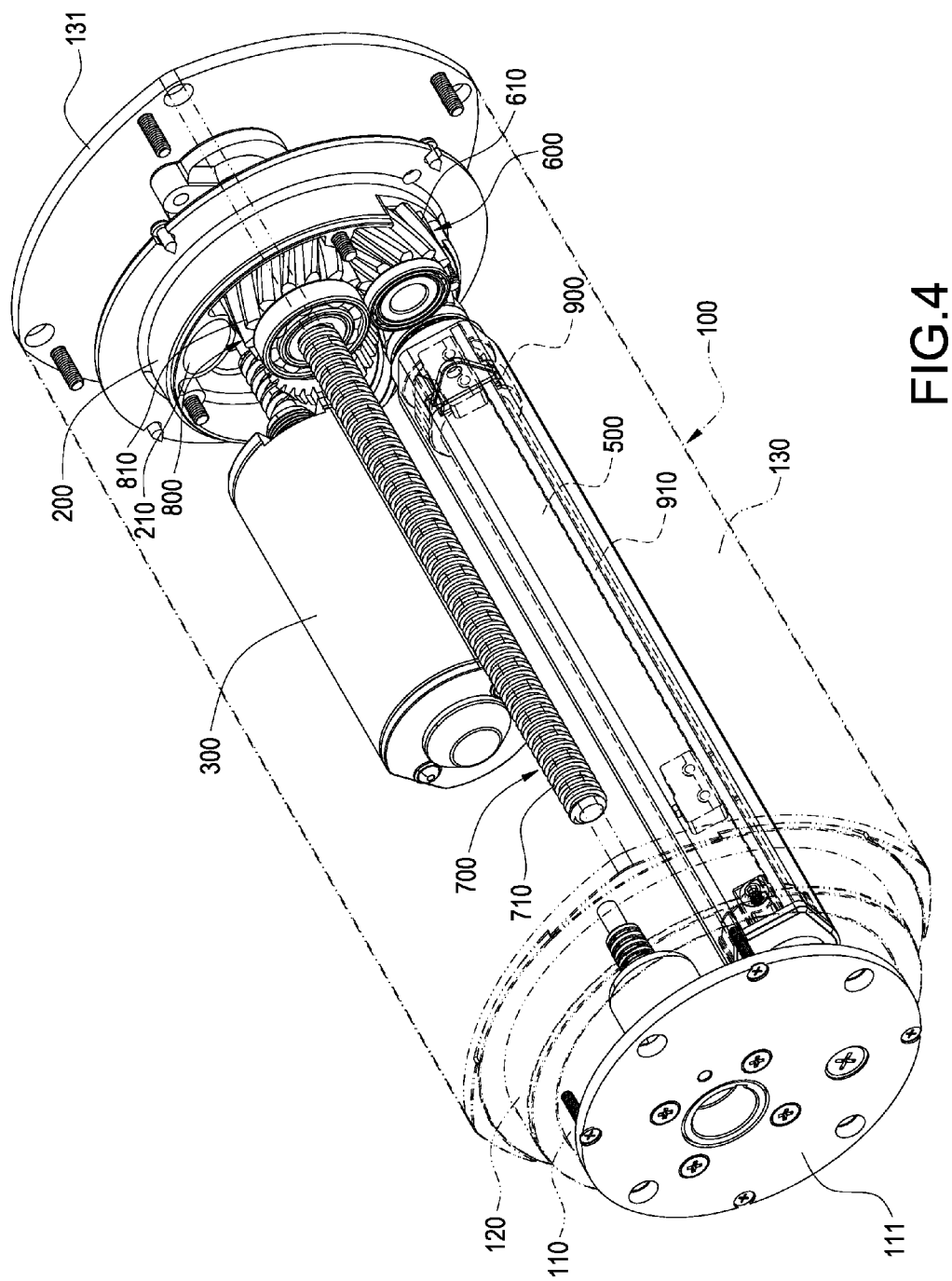
FIG. 4 is the third schematic view showing the extended linear actuator in the first embodiment of the present disclosure.
Figure 5:
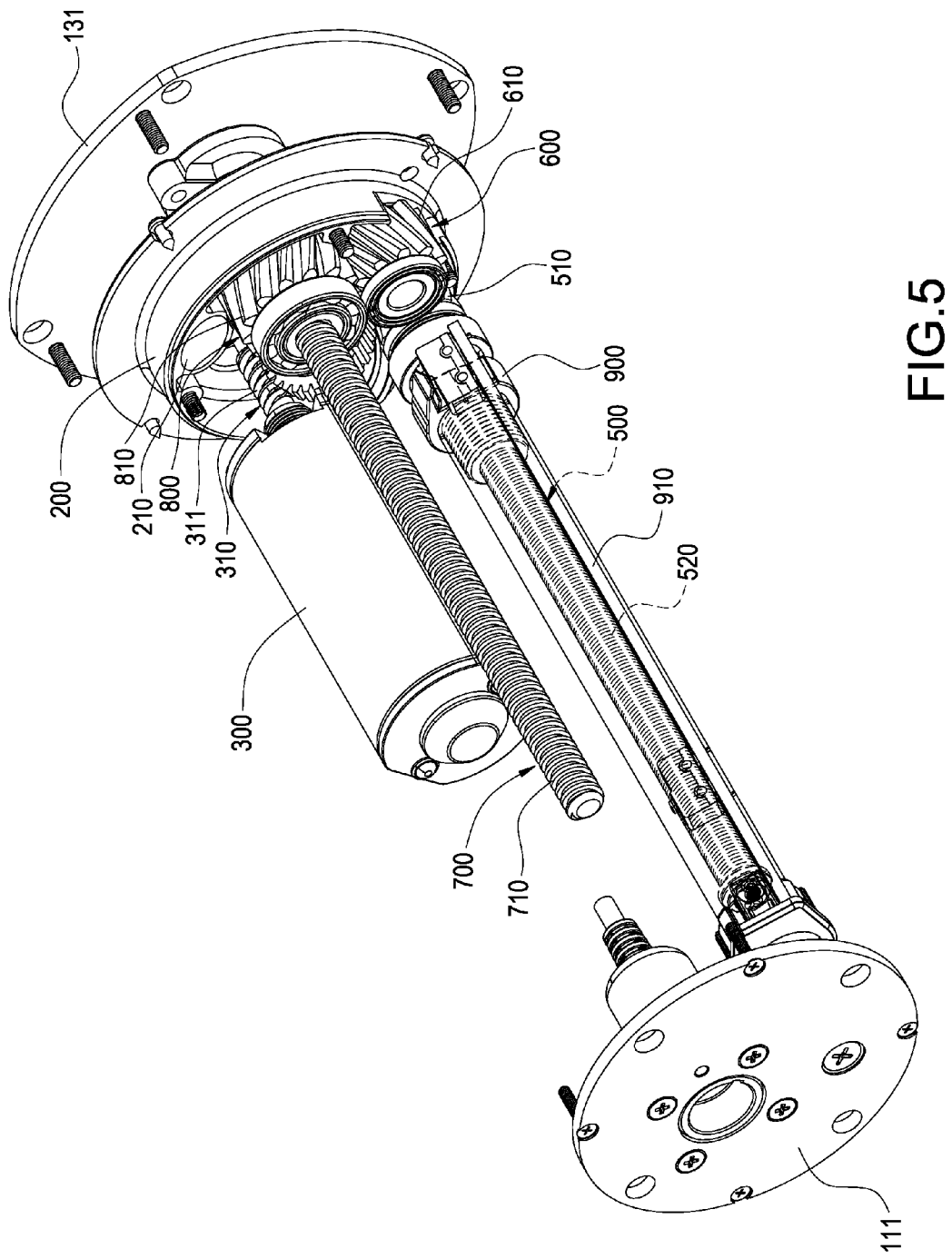
FIG. 5 is an exploded diagram showing the first embodiment of the present disclosure.
Figure 6:
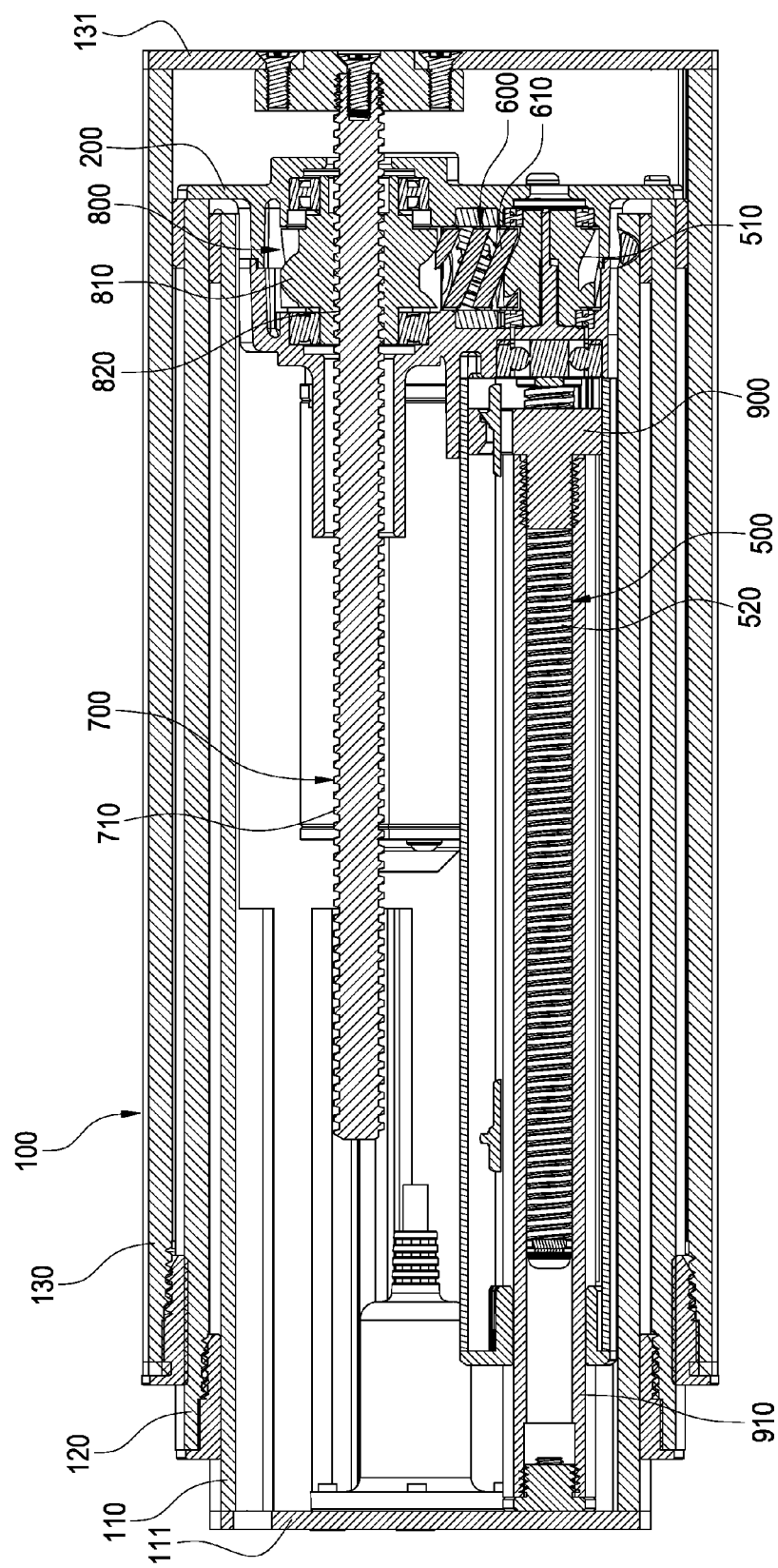
FIG. 6 is a longitudinal sectional view showing the rotor worm in the first embodiment of the present disclosure.
Figure 7:
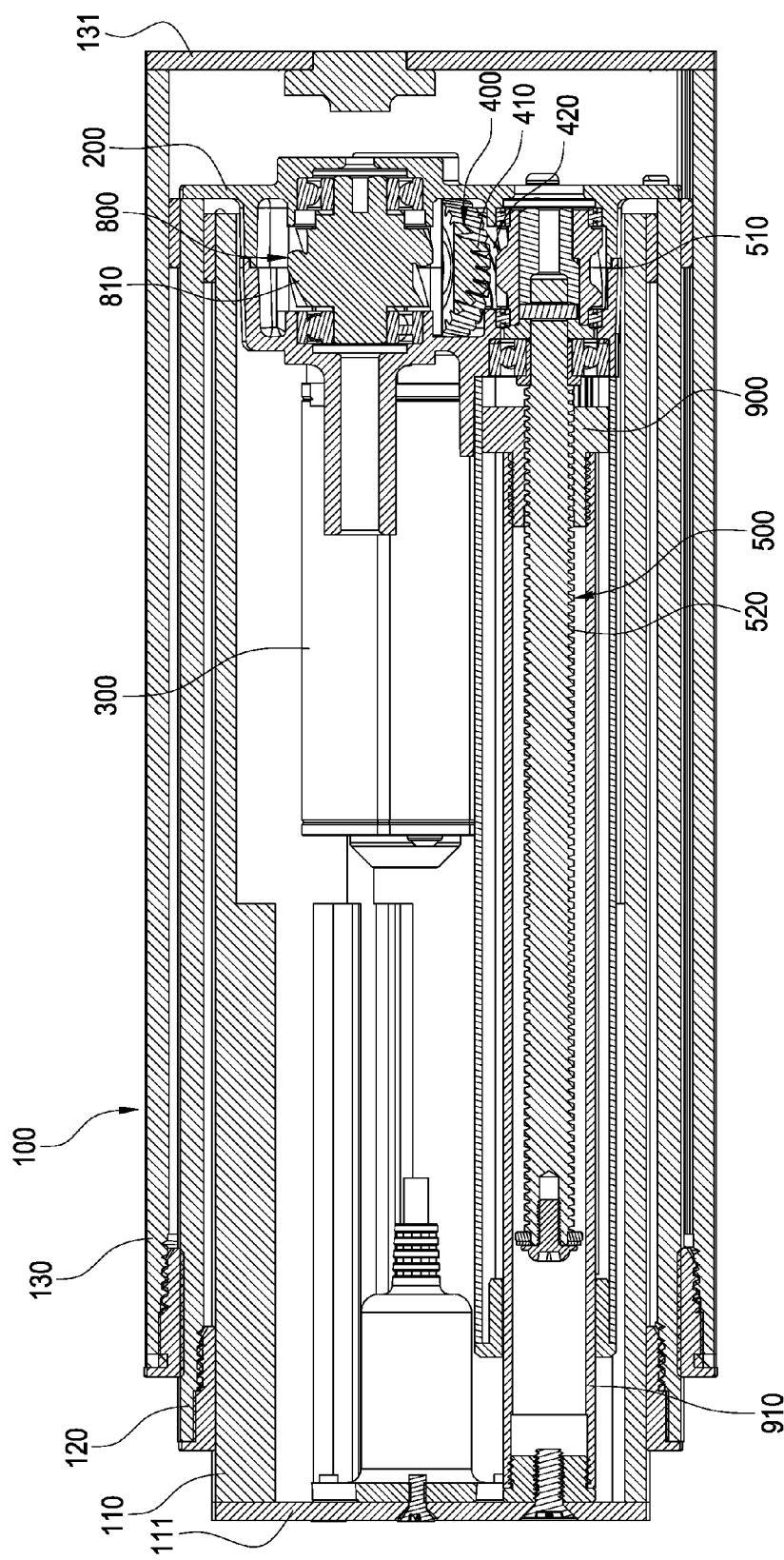
FIG. 7 is a longitudinal sectional view showing the stator worm in the first embodiment of the present disclosure.
Figure 8:
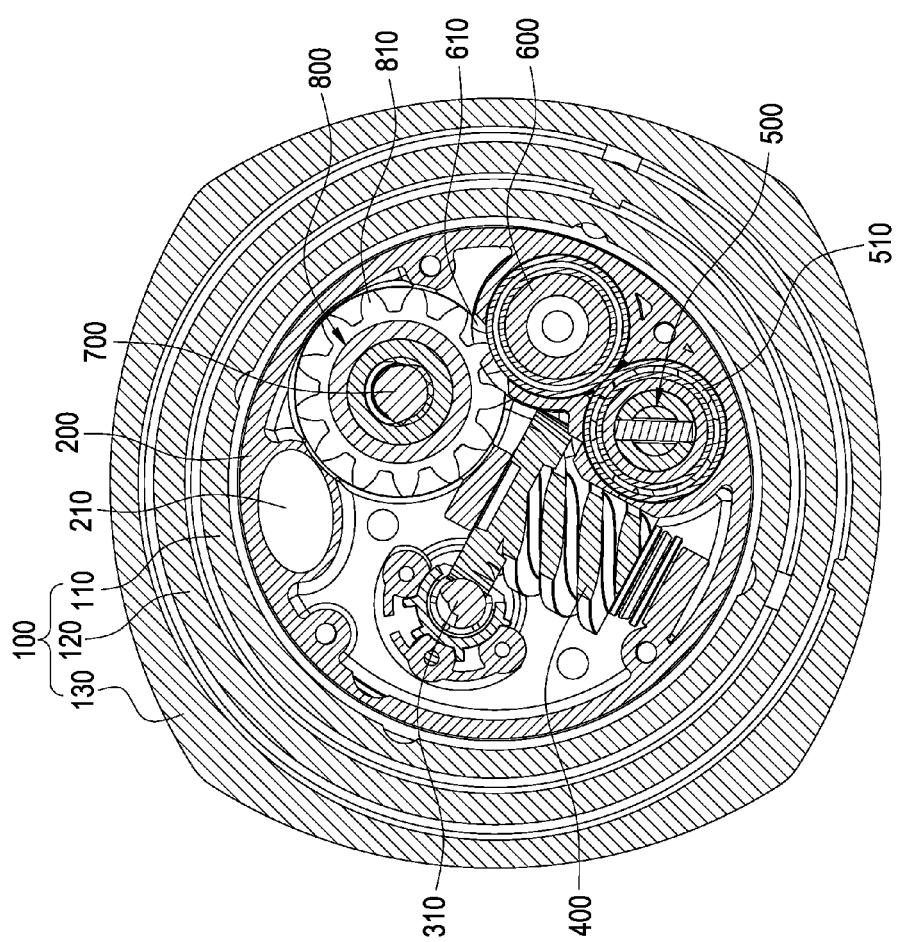
FIG. 8 is a cross-section view showing the linear actuator in the first embodiment of the present disclosure.
Figure 9:
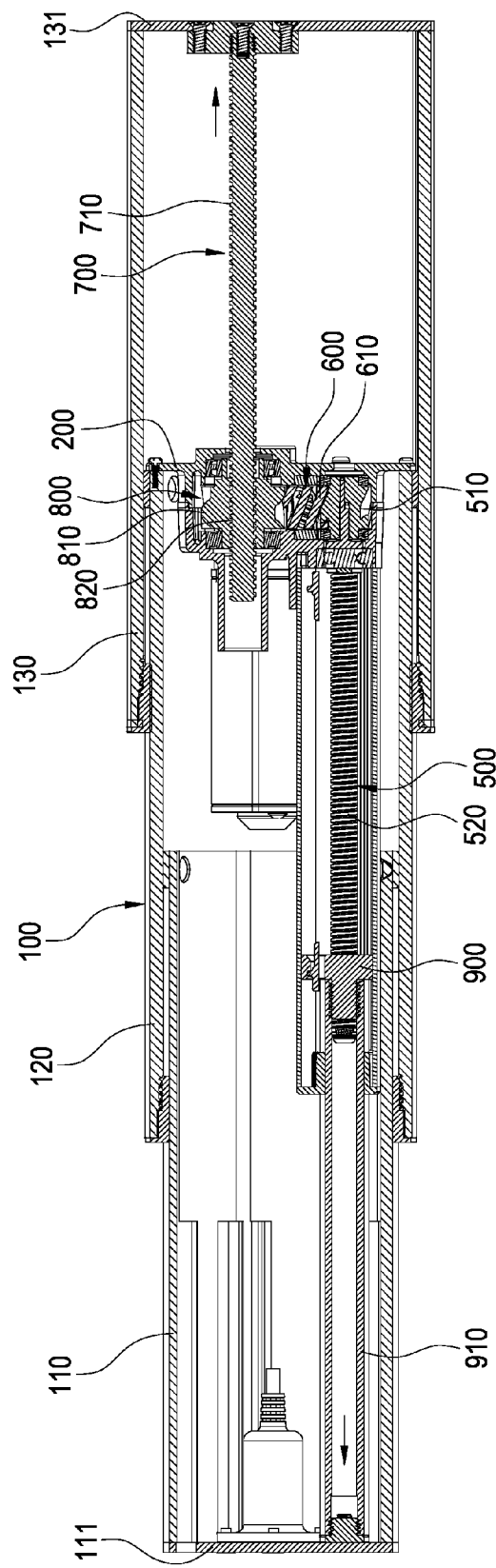
FIG. 9 is a longitudinal sectional view showing the rotor worm of the extended linear actuator in the first embodiment of the present disclosure.
Figure 10:
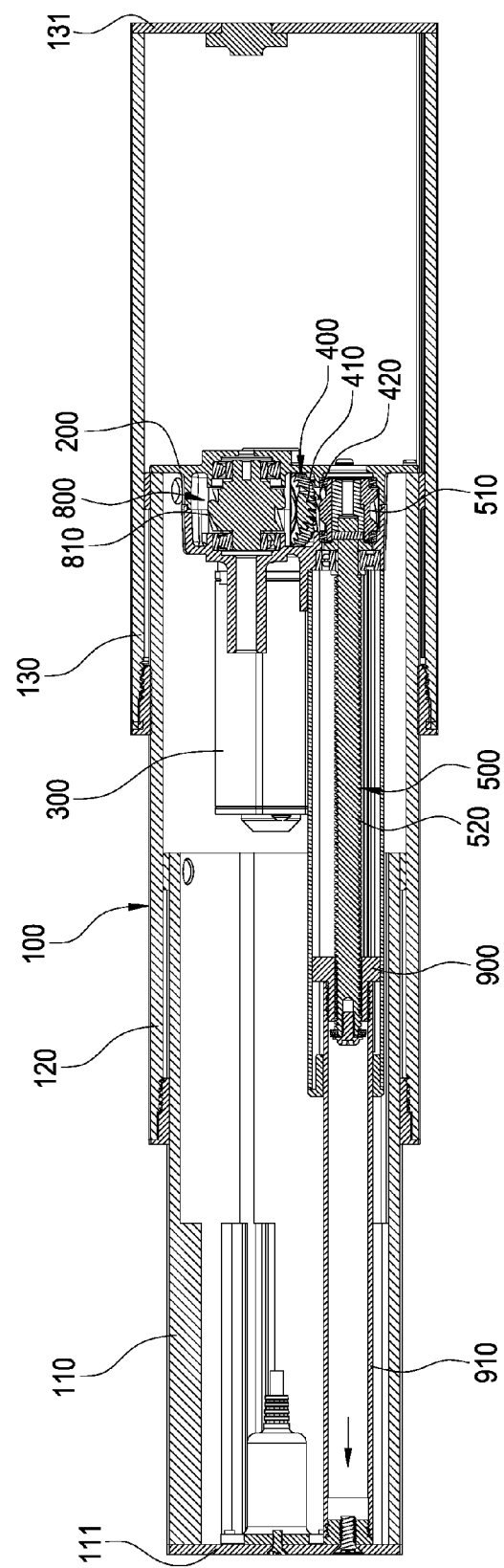
FIG. 10 is a longitudinal sectional view showing the stator worm of the extended linear actuator in the first embodiment of the present disclosure.

Please refer to FIGS. 1 and 2. A linear actuator including a telescoping sleeve 100 is provided in the first embodiment of the present disclosure. The telescoping sleeve 100 is included of an inner sleeve 110, an intermediate sleeve 120 and an outer sleeve 130 sheathed with each other. Please refer to FIG. 3-5. A base 200, a motor 300, a reduction worm gear 400, a rotor worm 500, a passive worm gear 600, a stator worm 700, a rotor worm gear 800 and a stator nut 900 are arranged in the telescoping sleeve 100. The intermediate sleeve 120 sleeves the inner sleeve 110, the outer sleeve 130 sleeves the intermediate sleeve 120, and the inner sleeve 110 and the outer sleeve 130 are respectively able to move with respect to the intermediate sleeve 120. The telescoping sleeve is thereby adjust an exterior length thereof (refer to FIGS. 1 and 2).

Please refer to FIGS. 3 and 5-8. In the present embodiment, an end of the intermediate sleeve 120 is covered and closed by the base 200, and the other end of the intermediate sleeve 120 is open and sheathing the inner sleeve 110. The outer sleeve 130 is a pillar having an approximately rectangular cross-section, each of the four lateral surfaces thereof is a protruding cambered surface, an internal surface thereof is of a cylinder shape, and a peak of each lateral surface has a tangential direction the same with that of the internal surface. An end of the outer sleeve 130 is covered and closed by a bottom plate 131, and the other end of the outer sleeve 130 is open and sheathing the intermediate sleeve 120. An end of the inner sleeve 110 is covered and closed by a top plate 111, and the other end of the inner sleeve 110 is open and inserted in the intermediate sleeve 120.

The base 200 is preferably of bow shape, and a cable insertion hole 210 is defined thereon. An end of the intermediate sleeve 120 is covered by the base 200, and the base 200 is bolted on the intermediate sleeve 120. The motor 300, the reduction worm gear 400, the rotor worm 500, the passive worm 600 and the rotor worm gear 800 are arranged on the base 200 and contained in the intermediate sleeve 120.

The motor 300 is included of an output axis 310, an axial direction of the output axis 310 is parallel with another axial direction of the telescoping sleeve 100, and output worm teeth 311 are provided on a lateral surface of the output axis 310. Cables are inserted through the cable insertion hole 210 and electrically connected to the motor 300, and thereby supply power to drive the motor 300 or transfer signals to control the motor 300.

An axial direction of the reduction worm gear 400 is parallel with the axial direction of the telescoping sleeve 100, the worm gear 400 is pivoted on an internal surface of the base 200, and high-speed worm teeth 410 corresponding to the output worm teeth 311 and low-speed worm teeth 420 corresponding to the rotor worm 500 are provided on a lateral surface of the reduction worm gear 400. The worm gear 400 is thereby engaged with the output axis 310 of the motor 300 and driven to axially rotate by the motor 300. A bearing 430 is preferably arranged between the reduction worm gear 400 and the base 200 to bear the friction between those while the reduction worm gear 400 is rotating.

The rotor worm 500 is of a rod shape, and the rotor worm 500 is parallel with the axial direction of the telescoping sleeve 100. Driving worm teeth 510 corresponding to the low-speed worm gear 420 and the passive worm gear 610 are arranged on a lateral surface of an end of the rotor worm 500, and the end is pivoted on an internal bottom of the base 200 along an axial direction of the rotor worm 500. First actuating worm teeth 520 corresponding to the stator nut 900 are provided on the lateral surface of the rotor worm 500. The driving worm teeth 510 of the rotor worm 500 are engaged with the low-speed worm teeth 420 of the reduction worm gear 400, and the rotor worm 500 is thereby driven to rotate along the axial direction thereof by the reduction worm gear 400.

An axial direction of the passive worm gear 600 is perpendicular with the axial direction of the telescoping sleeve 100. The passive worm gear 600 is pivoted on the internal bottom of the base 200 along the axial direction of the passive worm gear 600. Passive worm teeth 610 corresponding to the driving worm teeth 510 are provided on a lateral surface of the passive worm gear 600, the passive worm teeth 610 are thereby engaged with the rotor worm 500, and the passive worm gear 600 is thereby driven to rotate by the rotor worm 500.

The stator 700 is of a rod shape and having second actuating worm teeth 710 thereon, an axial direction of the stator 700 is parallel with the axial direction of the telescoping sleeve 100. And end of the stator 700 is bolted on the bottom plate 131 of the outer sleeve 130, and the stator 700 is off-set to a side of the outer sleeve 130. The other end of the stator 700 is inserted in the intermediate sleeve 120 through the rotor worm gear 800.

An axial direction of the rotor worm gear 800 is parallel with the axial direction of the telescoping sleeve 100. The rotor worm gear 800 is pivoted on the internal bottom of the base 200 along the axial direction of the rotor worm gear 800. The rotor worm gear 800 is of a hollow cylindrical shape. Outer worm teeth 810 corresponding to the passive worm teeth 610 are provided on an external surface of the rotor worm gear 800, and the rotor worm gear 800 is thereby engaged with the passive worm gear 600 and driven to rotate by the passive worm gear 600. Inner worm teeth 820 corresponding to the second actuating worm teeth 710 are provided on an internal surface of the rotor worm gear 800, and the second actuating worm teeth 710 are engaged with the inner worm teeth 820 of the rotor worm gear 800.

An axial direction of the stator nut 900 is parallel with the axial direction of the telescoping sleeve 100, and the stator nut 900 is fixed in the inner sleeve 110 via a casing tube 910. In the present embodiment, the casing tube 910 is preferably inserted in the telescoping sleeve 100, an end of the casing tube 910 is bolted on the top plate 111 of the inner sleeve 110, and the casing tube 910 is off-set to a side of the inner sleeve 110. The stator nut 900 is arranged on the other end of the casing tube 910. The rotor worm 500 is inserted in the casing tube 910, and the stator nut 900 is sheathing the rotor worm 500 and engaged with the first actuating worm gear 520.

Please refer to FIGS. 1, 2 and 8-10. In the present disclosure, the driving worm teeth 510, the first actuating worm teeth 520, the second actuating worm teeth 710 and the outer worm gear 810 of the rotor worm gear 800 have the same helix and the passive worm gear 610 has a counter helix. While the motor 300 drives the reduction worm gear 400 to rotate, the rotor worm 500 and the rotor worm gear 800 are thereby driven to rotate. The stator nut 900 is axial off-set with respect to the telescoping sleeve 100, and the inner sleeve 110 is therefore not able to rotate with respect to the intermediate sleeve 120 while the rotor worm 500 is rotating. Accordingly, the stator nut 900 is moved with respect to the rotor worm 500, and the inner sleeve 110 is thereby moved with respect to the intermediate sleeve 120 along the axial direction thereof. The inner sleeve 110 could be stretched from the intermediate sleeve 120 or retracted into the intermediate sleeve 120 via rotate the output axis 310 of the motor 300 along corresponding direction.

The rotor worm 500 and the stator worm 700 are arranged in the telescoping sleeve 100, and the inner sleeve 110 and the outer sleeve are able to be respectively driven by the dual worm 500/700 to move with respect to the intermediate sleeve 120 simultaneously. Thereby, the linear actuator is able to move an object (such as a door or a sickbed) rapidly. One of the top plate 111 and the bottom plate 131 is connected to a fix object and the other is used to pull another object. The linear actuator of the present disclosure is included of dual worm, and therefore able to extend bi-direction to rapidly move an object. The motor is arranged in the telescoping sleeve, and the linear actuator is therefore downsized for application in a narrow place. The motor drives other elements via the reduction worm gear, and the linear actuator is much stable than a conventional one which drives other elements via a reduction gear.

Figure 11:
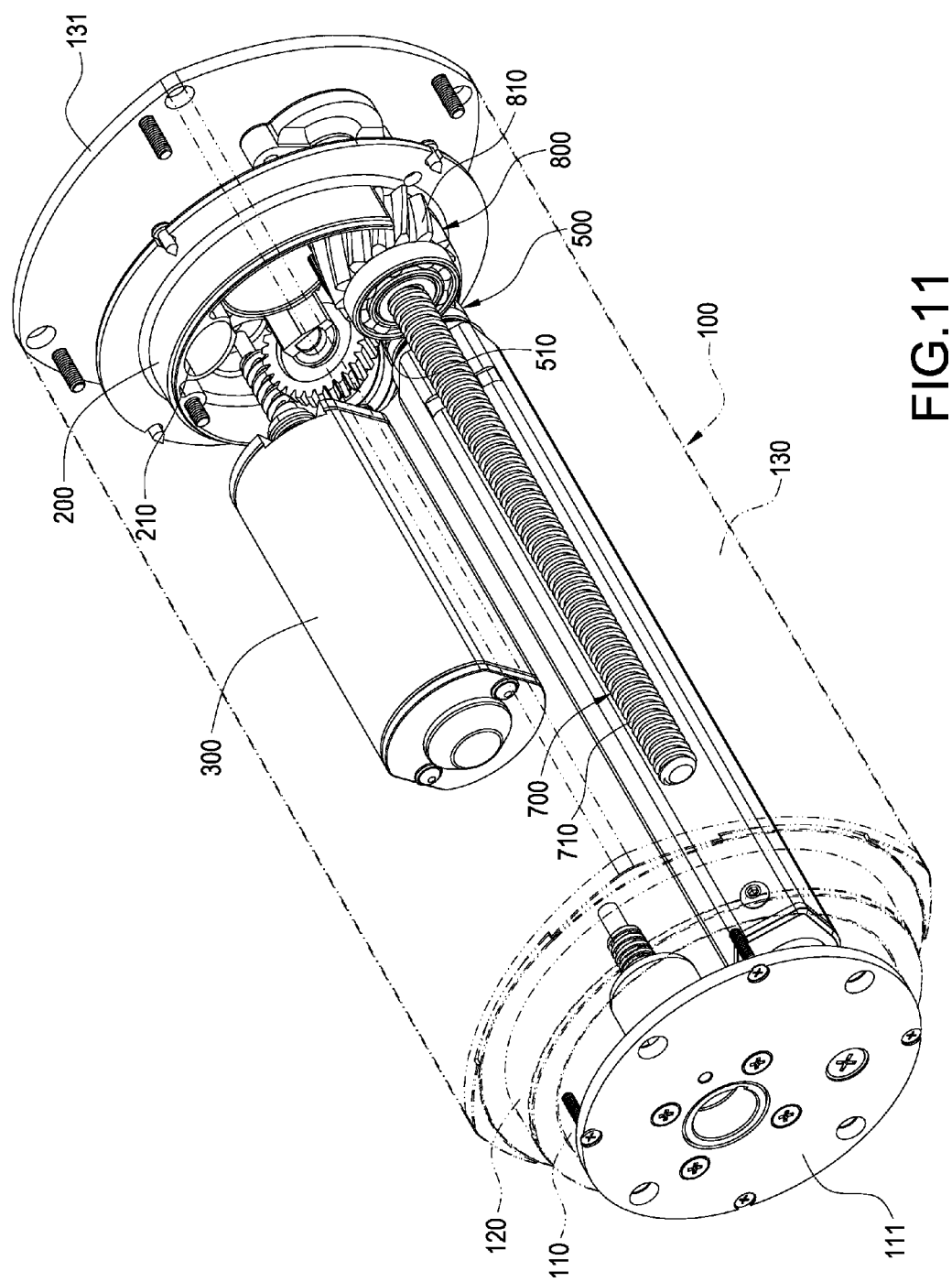
FIG. 11 is a schematic view showing the second embodiment of the present disclosure.

Please refer to FIG. 11. A linear actuator including a telescoping sleeve 100 is provided in the second embodiment of the present disclosure. The telescoping sleeve 100 is included of an inner sleeve 110, an intermediate sleeve 120 and an outer sleeve 130 sheathed with each other. Please refer to FIG. 3-5. A base 200, a motor 300, a reduction worm gear 400, a rotor worm 500, a passive worm gear 600, a stator worm 700, a rotor worm gear 800 and a stator nut 900 are arranged in the telescoping sleeve 100. The intermediate sleeve 120 sleeves the inner sleeve 110, the outer sleeve 130 sleeves the intermediate sleeve 120, and the inner sleeve 110 and the outer sleeve 130 are respectively able to move with respect to the intermediate sleeve 120. The telescoping sleeve is thereby adjust an exterior length thereof (refer to FIGS. 1 and 2).

In the present embodiment, the linear actuator is similar to the first embodiment, that will no more be described in the present embodiment, and the difference are described below.

The driving worm teeth 510, the first actuating worm teeth 520, have the same helix, and the second actuating worm teeth 710 and the outer worm gear 810 of the rotor worm gear 800 have a counter helix. The first actuating worm teeth 520 of the rotor worm 500 is engaged with the outer worm gear 810 of the rotor worm gear 800. The rotor worm gear 800 is thereby driven to axially rotate by the rotor worm 500.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the present disclosure as defined in the appended claims.

What is claimed is:

1. A linear actuator comprising a telescoping sleeve (100), the telescoping sleeve (100) being comprised of an inner sleeve (110), an intermediate sleeve (120) sheathing the inner sleeve (110) and an outer sleeve (130) sheathing the intermediate sleeve (120), a base (200) being connected to the intermediate sleeve (120), a motor (300) being arranged on the base (200), a reduction worm gear (400) being pivoted on the base (200) and driven by the motor, a rotor worm (500) being pivoted on the base (200) and engaged with the reduction worm gear (400), a rotor worm gear (800) being pivoted on the base (200), a stator worm (700) being inserted in the rotor worm gear (800) and connected to the outer sleeve (130), and a stator nut (900) being connected to the inner sleeve (110) and engaged with the rotor worm (500), wherein the motor (300), the rotor worm (500) and the stator worm (700) arrange at intervals and around a center of the base (200); a lateral surface of an output shaft (310) of the motor (300) is formed with output worm teeth (311); high-speed worm teeth (410) engaged with the output worm teeth (311) and low-speed worm teeth (420) engaged with actuating worm teeth (520) of the rotor worm (500) are provided on a lateral surface of the reduction worm gear (400); an axial direction of the reduction worm gear (400) is perpendicular to axial directions of the motor and the rotor worm (500); the rotor worm (500) and the rotor worm gear (800) are engaged by a passive worm gear (600), so that when the reduction worm gear (400) is driven by the motor (300) to rotate, the rotor worm (500) will be driven by the reduction worm gear (400), and the rotor worm (500) will thus drive the passive worm gear (600) to rotate, and the rotor worm gear (800) will be further driven by the passive worm gear (600) to rotate, wherein external surfaces of the rotor worm (500), the passive worm gear (600), and the rotor worm gear (800) are formed with driving worm teeth (510), passive worm teeth (610), and outer worm teeth (810), respectively, and wherein the driving worm teeth (510), the passive worm teeth (610), and the outer worm teeth (810) are helical teeth.

2. The linear actuator according to claim 1, wherein a bearing (430) is arranged between the reduction worm gear (400) and the base (200).

3. The linear actuator according to claim 1, wherein an end of the outer sleeve (130) is covered and closed by a bottom plate (131), and the other end of the outer sleeve (130) is open and sheathing the intermediate sleeve (120).

4. The linear actuator according to claim 3, wherein an end of the stator worm (700) is fixed on the bottom plate (131).

5. The linear actuator according to claim 1, wherein an end of the intermediate sleeve (120) is covered and closed by the base (200), and the other end of the intermediate sleeve (120) is open and sheathing the inner sleeve (110).

6. The linear actuator according to claim 1, wherein an end of the inner sleeve (110) is covered and closed by a top plate (111), and the other end of the inner sleeve (110) is open and inserted in the intermediate sleeve (120).

7. The linear actuator according to claim 1, further comprising a casing tube (910) inserted in the telescoping sleeve (100), an end of the casing tube (910) is connected on the top plate, the stator nut (900) is connected on the other end of the casing tube (910), and the rotor worm (500) is inserted in the casing tube (910).

8. The linear actuator according to claim 1, wherein the rotor worm gear (800) is of a hollow cylindrical shape, inner worm teeth (820) are provided on an internal surface of the rotor worm gear (800), the outer worm teeth (810) are engaged with the passive worm gear (600), and the inner worm teeth (820) are engaged with the stator worm (700).

9. The linear actuator according to claim 1, wherein the motor (300), the rotor worm (500), the passive worm gear (600), the rotor worm gear (800), the stator worm (700), and the stator nut (900) are axially parallel with the telescoping sleeve (100).

10. The linear actuator according to claim 1, wherein the stator worm (700) is off-axis corresponding to the telescoping sleeve (100).

11. The linear actuator according to claim 1, wherein the stator nut (900) is off-axis corresponded to the telescoping sleeve (100).

* * * * *